United States Patent
Ishii et al.

(10) Patent No.: US 10,220,953 B2
(45) Date of Patent: Mar. 5, 2019

(54) AERIAL VEHICLE

(71) Applicants: NIPPON SOKEN, INC., Nishio, Aichi-pref. (JP); DENSO CORPORATION, Kariya, Aichi-pref. (JP)

(72) Inventors: Hiroki Ishii, Nishio (JP); Koji Kawasaki, Nishio (JP); Takenori Matsue, Nishio (JP); Shinji Andou, Nishio (JP); Hiroyasu Baba, Nishio (JP)

(73) Assignees: SOKEN, INC., Nishio, Aichi-pref. (JP); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/367,247

(22) Filed: Dec. 2, 2016

(65) Prior Publication Data

US 2017/0158342 A1  Jun. 8, 2017

(30) Foreign Application Priority Data

Dec. 4, 2015  (JP) ................... 2015-237533

(51) Int. Cl.
  *G05D 1/08* (2006.01)
  *B64D 31/10* (2006.01)
  (Continued)

(52) U.S. Cl.
  CPC ............ *B64D 31/10* (2013.01); *B64C 27/08* (2013.01); *B64C 39/024* (2013.01); *G05D 1/042* (2013.01);
  (Continued)

(58) Field of Classification Search
  CPC ....... B64D 31/10; B64C 27/08; B64C 39/024; B64C 2201/024; B64C 2201/027;
  (Continued)

(56) References Cited

U.S. PATENT DOCUMENTS

| | | | | |
|---|---|---|---|---|
| 3,743,855 A | * | 7/1973 | Struger | ................... B60R 22/48 326/124 |
| 6,612,522 B1 | * | 9/2003 | Aldrin | ................... B64G 1/002 244/159.3 |

(Continued)

FOREIGN PATENT DOCUMENTS

| | | |
|---|---|---|
| JP | 2002-347698 A | 12/2002 |
| JP | 2014-227155 A | 12/2014 |

*Primary Examiner* — Behrang Badii
*Assistant Examiner* — Daniel L Greene
(74) *Attorney, Agent, or Firm* — Harness, Dickey & Pierce, P.L.C.

(57) ABSTRACT

In an aerial vehicle, a malfunction determiner determines whether there is a malfunction in one of thrusters of the aerial vehicle. A flight controller activates the thrusters, and controls the output of each of the thrusters. The flight controller deactivates, when it is determined that there is a malfunction in one of the thrusters as a malfunctioned thruster, the malfunctioned thruster. The flight controller deactivates a selected thruster in the thrusters; the selected thruster being paired to the malfunctioned thruster, and controls the active thrusters except for the deactivated thrusters in all the thrusters to make the flight attitude of the aerial vehicle stable. The flight controller controls the active thrusters to cause the aerial vehicle to land while maintaining the flight attitude of the aerial vehicle being stable.

4 Claims, 13 Drawing Sheets

(51) Int. Cl.
*G07C 5/08* (2006.01)
*G05D 1/04* (2006.01)
*B64C 27/08* (2006.01)
*B64C 39/02* (2006.01)

(52) U.S. Cl.
CPC ......... *G05D 1/0816* (2013.01); *G07C 5/0808* (2013.01); *B64C 2201/024* (2013.01); *B64C 2201/027* (2013.01); *B64C 2201/108* (2013.01); *B64C 2201/141* (2013.01)

(58) Field of Classification Search
CPC ........ B64C 2201/108; B64C 2201/141; G05D 1/042; G05D 1/0816; G07C 5/0808
See application file for complete search history.

(56) References Cited

U.S. PATENT DOCUMENTS

| | | | | |
|---|---|---|---|---|
| 7,159,817 | B2* | 1/2007 | VanderMey | B64C 29/0016 244/12.1 |
| 7,946,528 | B2* | 5/2011 | Yoeli | B64C 27/20 244/194 |
| 8,616,492 | B2* | 12/2013 | Oliver | B64C 29/0033 244/12.4 |
| 8,720,814 | B2* | 5/2014 | Smith | B64C 29/0033 244/12.4 |
| 8,800,912 | B2* | 8/2014 | Oliver | B64C 29/0033 244/12.4 |
| 2003/0085319 | A1* | 5/2003 | Wagner | B64C 3/56 244/12.3 |
| 2010/0083669 | A1* | 4/2010 | Foster | F02C 6/18 60/802 |
| 2014/0027564 | A1* | 1/2014 | Mercer | B64C 27/56 244/17.13 |

* cited by examiner

FIG.1
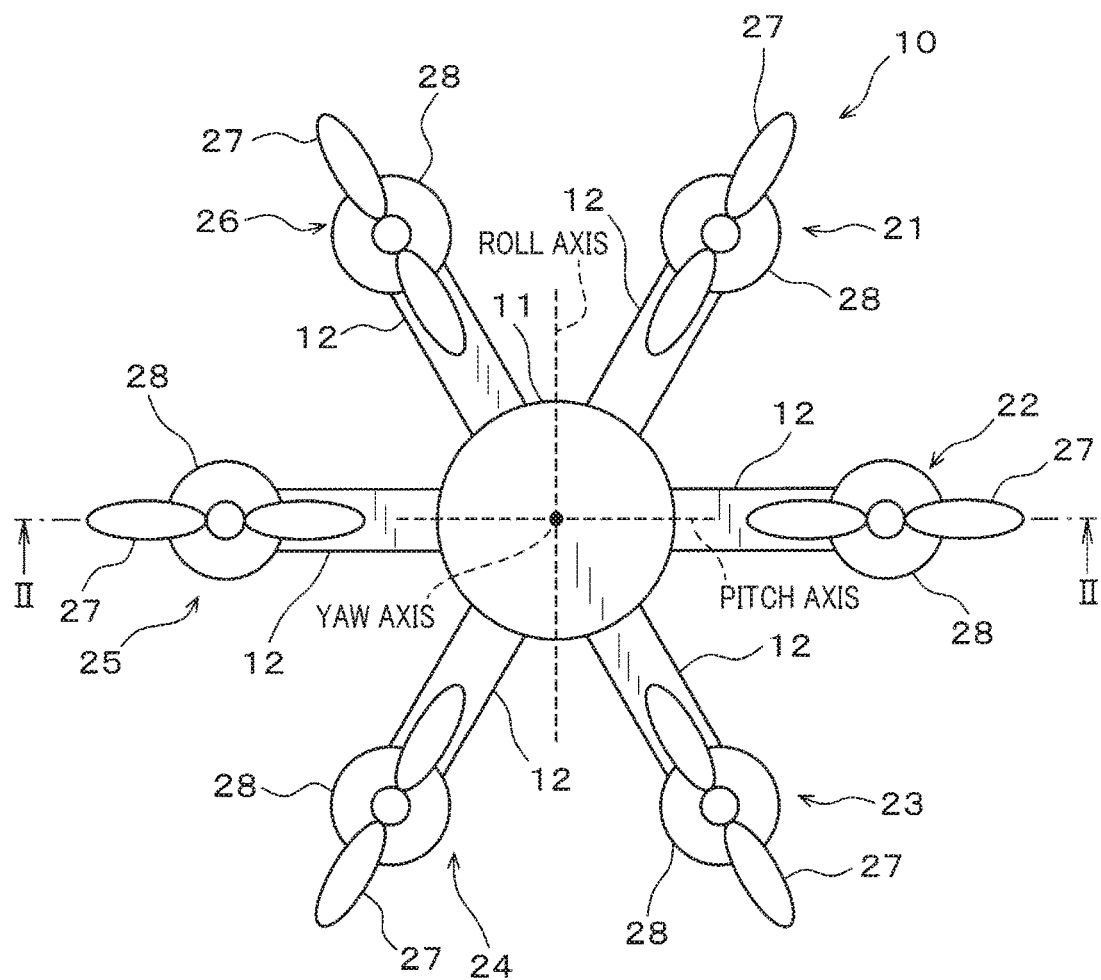
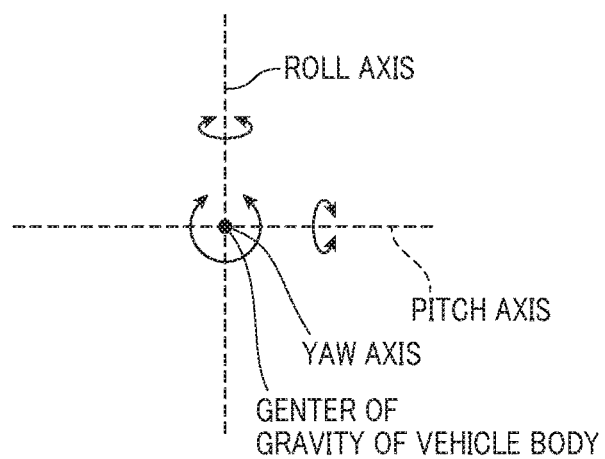

AERIAL VEHICLE

CROSS REFERENCE TO RELATED APPLICATIONS

This application is based on and claims the benefit of priority from Japanese Patent Application 2015-237533 filed on Dec. 4, 2015, the disclosure of which is incorporated in its entirety herein by reference.

TECHNICAL FIELD

The present disclosure relates to aerial vehicles.

BACKGROUND

Conventional aerial vehicles include thrusters, and are configured to fly based on aerodynamic lift generated by the thrusters. A malfunction of any thruster of an aerial vehicle may reduce the aerodynamic lift, resulting in the flight attitude of the aerial vehicle being unstable. Japanese Patent Application Publications No. 2014-227155 and 2002-347698, which are referred to as patent documents 1 and 2, each disclose an aerial vehicle configured to make its flight attitude stable even if there is a malfunction in any of the thrusters of the aerial vehicle.

SUMMARY

Unfortunately, each of the patent documents 1 and 2 merely discloses an aerial vehicle configured to make its flight attitude stable even if there is a malfunction in one of the thrusters of the aerial vehicle. That is, each of the patent documents 1 and 2 fails to disclose any procedures to ensure the safety of the aerial vehicle whose flight attitude has been stable.

In view of the circumstances set forth above, an exemplary aspect of the present disclosure seeks to provide aerial vehicles each including thrusters; each of the aerial vehicles is capable of making the flight attitude of the aerial vehicle stable while ensuring the safety of the aerial vehicle even if there is a malfunction in one of the thrusters.

According to a first exemplary aspect of the present disclosure, there is provided an aerial vehicle. The aerial vehicle includes a vehicle body, and plural pairs of arms each having opposing first and second ends. The first end of each arm is joined to the vehicle body. The arms of each pair radially extend from the vehicle body to be symmetrical with one another with respect to the vehicle body. The aerial vehicle includes thrusters mounted on the second ends of the respective arms. The thruster in one of the arms in each pair is paired to the thruster of the other of the arms in the pair. Each of the thrusters is configured to generate aerodynamic force as an output thereof. The aerial vehicle includes a flight attitude detector configured to detect a flight attitude of the aerial vehicle, and a malfunction determiner configured to determine whether there is a malfunction in one of the thrusters. The aerial vehicle includes a flight controller. The flight controller is configured to 1. Activate the thrusters
2. Control the output of each of the thrusters
3. Deactivate, when it is determined that there is a malfunction in one of the thrusters as a malfunctioned thruster, the malfunctioned thruster
4. Deactivate a selected thruster in the thrusters; the selected thruster being paired to the malfunctioned thruster
5. Control the active thrusters except for the deactivated thrusters in all the thrusters to make the flight attitude of the aerial vehicle stable
6. Control the active thrusters to cause the aerial vehicle to land while maintaining the flight attitude of the aerial vehicle stable.

The configuration of the aerial vehicle according to the first exemplary aspect enables the aerial vehicle to land while maintaining the flight attitude of the aerial vehicle stable even if there is a malfunction in one of the thrusters.

According to a second exemplary aspect of the present disclosure, there is provided an aerial vehicle. The aerial vehicle includes a vehicle body, and plural pairs of arms each having opposing first and second ends, the first end of each arm being joined to the vehicle body. The arms of each pair radially extend from the vehicle body to be symmetrical with one another with respect to the vehicle body. The aerial vehicle includes thrusters mounted on the second ends of the respective arms. The thruster in one of the arms in each pair is paired to the thruster of the other of the arms in the pair. Each of the thrusters is configured to generate aerodynamic force as an output thereof. The aerial vehicle includes a flight attitude detector configured to detect a flight attitude of the aerial vehicle, and a flight altitude detector configured to detect a flight altitude of the aerial vehicle. The aerial vehicle includes a flight position detector configured to detect a flight position of the aerial vehicle, a malfunction determiner configured to determine whether there is a malfunction in one of the thrusters, and a flight controller. The flight controller is configured to 1. Activate the thrusters
2. Control the output of each of the thrusters
3. Deactivate, when it is determined that there is a malfunction in one of the thrusters as a malfunctioned thruster, the malfunctioned thruster
4. Deactivate a selected thruster in the thrusters; the selected thruster being paired to the malfunctioned thruster
5. Control the active thrusters except for the deactivated thrusters in all the thrusters to make the flight attitude of the aerial vehicle stable
6. Increase the output of each of the active thrusters
7. Determine whether the flight altitude of the aerial vehicle detected by the flight altitude detector at least has been maintained since the increasing of the output of each of the active thrusters
8. Perform a continuous flying task that individually controls the output of each of the active thrusters to continuously fly the aerial vehicle up to a predetermined place while maintaining the flight attitude of the aerial vehicle stable when it is determined that the flight altitude of the aerial vehicle detected by the flight altitude detector at least has been maintained since the increasing of the output of each of the active thrusters
9. Individually control, based on the flight position of the aerial vehicle detected by the flight position detector, the output of each of the active thrusters so that the aerial vehicle lands independently of the flight altitude of the aerial vehicle while maintaining the flight attitude of the aerial vehicle stable when it is determined that the flight altitude of the aerial vehicle detected by the flight altitude detector has decreased since the increasing of the output of each of the active thrusters.

The configuration of the aerial vehicle according to the second exemplary aspect enables the aerial vehicle to continuously fly or land according to the remaining ability of the aerial vehicle while ensuring the safety of the aerial vehicle even if there is a malfunction in one of the thrusters.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more features of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 1 is a structural view schematically illustrating an aerial vehicle according to a first embodiment of the present disclosure;

DETAILED DESCRIPTION OF EMBODIMENT

Figure 2:
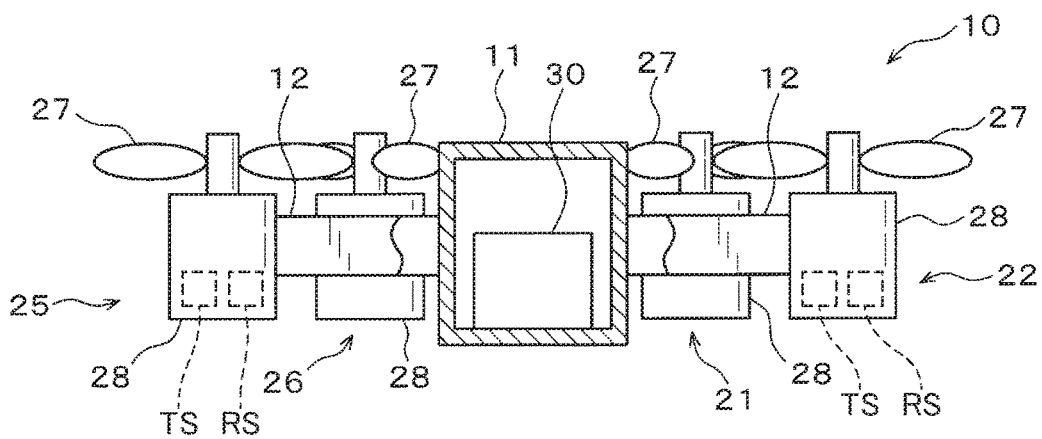
FIG. 2 is a cross sectional view taken on line II-II of FIG. 1.

The following describes embodiments of the present disclosure with reference to the accompanying drawings. Like parts between the embodiments, to which like reference characters are assigned, are omitted or simplified to avoid redundant description.

First Embodiment

Referring to FIGS. 1 and 2, an aerial vehicle 10 according to the first embodiment includes a vehicle body 11 and a plurality of arms 12 having identical configurations. For example, the vehicle body 11 has a hollow cylindrical shape with top and bottom surfaces 11a and 11b, and the vehicle body 11 is located at the center of gravity of the aerial vehicle 10.

Each of the arms 12 has first and second ends opposite to each other. The first end of each of the arms 12 is joined to the circumferential side surface of the vehicle body 11 such that the arm 12 radially extends from the circumferential side surface of the vehicle body 11. In particular, the aerial vehicle 10 according to the first embodiment is configured such that six arms 12 radially extend from the circumferential side surface of the vehicle body 11 while having regular intervals therebetween. In other words, the six arms 12 radially extend from the circumferential side surface of the vehicle body 11 to be symmetrical with each other with respect to the vehicle body 11. The six arms 12 include three pairs of arms 12. The arms 12 of each of the pairs extend from the vehicle body 11 in the respective opposite directions on the corresponding same radial line passing through the center of gravity of the aerial vehicle 10.

The aerial vehicle 10 also includes thrusters 21 to 26. Each of the thrusters 21 to 26 is mounted on the second end of the corresponding one of the arms 12. Each of the thrusters 21 to 26 includes a propeller 27 and a motor 28. The motor 28 of each thruster 21 to 26 is mounted on the second end of the corresponding arm 12. The propeller 27 of each thruster 21 to 26 is provided on the corresponding motor 28 to be rotatable about a rotational axis of the corresponding motor 28; the rotational axis is parallel to the center axis of the cylindrical vehicle body 11.

That is, each of the thrusters 21 to 26 is configured such that the corresponding motor 28 turns the corresponding propeller 27, thus generating and outputting aerodynamic force including aerodynamic lift and/or thrust force.

The thrusters 21 and 24 are provided to the corresponding pair of arms 12, so that the thrusters 21 and 24 are paired and opposite to each other, and the thrusters 22 and 25 are provided to the corresponding pair of arms 12, so that the thrusters 22 and 25 are paired and opposite to each other. Additionally, the thrusters 23 and 26 are provided to the corresponding pair of arms 12, so that the thrusters 23 and 26 are paired to each other.

Note that hatching of each of the thrusters 22 and 25 in FIG. 2 is omitted.

Figure 3:
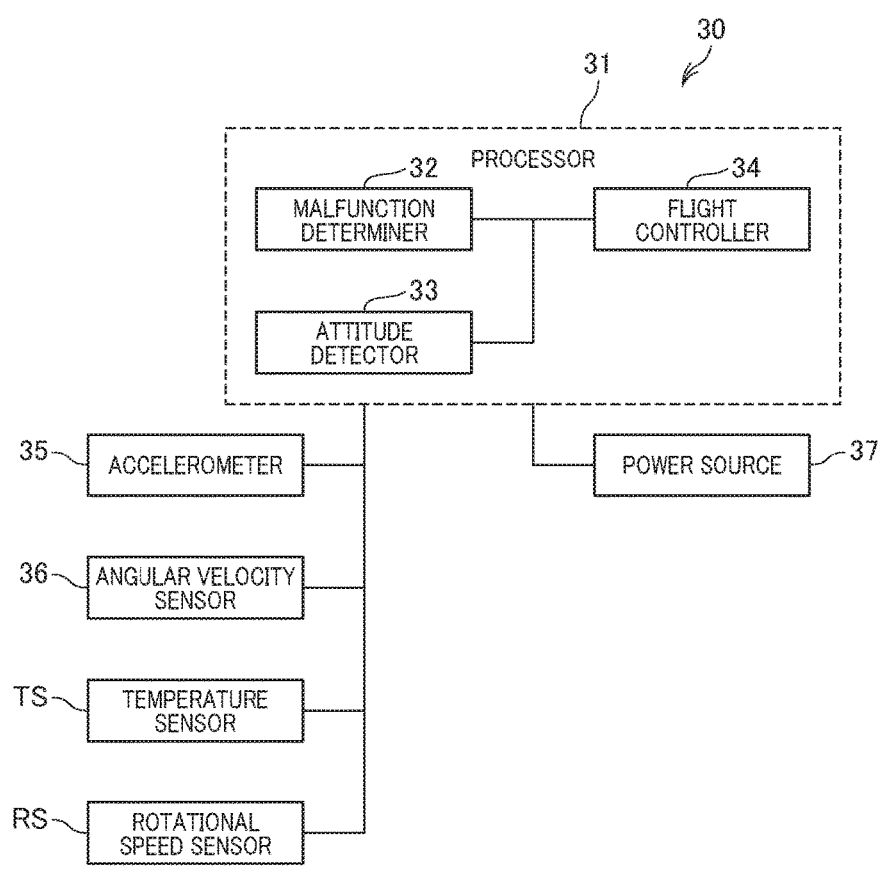
FIG. 3 is a schematic block diagram mainly illustrating an example of the structure of a control unit illustrated in FIG. 2.

Referring to FIGS. 2 and 3, the aerial vehicle 10 includes a control unit 30 installed in the vehicle body 11 for controlling the overall operations of the aerial vehicle 10.

The control unit 30 includes a processor 31 comprised of, for example, a microcomputer. The processor 31 includes essentially, for example, a CPU and a memory equipped with a ROM and a RAM, and its peripheral circuits including a communication interface.

The control unit 30 includes a malfunction determiner 32, an attitude detector 33, a flight controller 34, acceleration sensors, i.e. accelerometers, 35, angular velocity sensors 36, and a power source 37.

As illustrated in FIG. 3, temperature sensors TS are provided for the respective motors 28, and are communicable with the control unit 30. The temperature sensors TS are operative to measure the temperatures of the respective motors 28, and output the measured temperatures of the respective motors 28 to the control unit 30. In addition, rotational speed sensors RS are provided for the respective motors 28, and are communicable with the control unit 30. The rotational speed sensors RS are operative to measure the rotational speeds of the respective motors 28, and output the measured rotational speeds of the respective motors 28 to the control unit 30.

For example, the processor 31 runs programs stored in the memory to implement the malfunction determiner 32, the attitude detector 33, and the flight controller 34. For example, the modules 32 to 34 can be implemented in the control unit 30 as hardware units and/or hardware-software hybrid units.

Each of the acceleration sensors 35 is communicably connected to the processor 31. Each of the acceleration sensors 35 is operative to measure acceleration about the corresponding one of the pitch axis, roll axis, and yaw axis of the aerial vehicle 10; these pitch, roll, and yaw axes pass through the center of gravity of the aerial vehicle 10, which are illustrated as an example in FIG. 1.

Each of the angular velocity sensors 36 is communicably connected to the processor 31, and is operative to, for example, measure an angular velocity, i.e. an angular rate, about the corresponding one of the pitch axis, roll axis, and yaw axis of the aerial vehicle 10.

The power source 37 is implemented in the control unit 31 as, for example, a rechargeable battery. The power source 37 outputs electrical power as operating power for the motors 28.

The malfunction determiner 32 determines whether there is a malfunction in one of the thrusters 21 to 26. Specifically, the malfunction determiner 32 determines whether there is a malfunction in the motor 28 and the propeller 27 of each of the thrusters 21 to 26 as a function of, for example, at least one of (1) An electrical parameter, such as a current and/or a voltage, indicative of the electrical power supplied from the motor 28 of the corresponding thruster (2) The rotational speed of the motor 28 of the corresponding thruster measured by the corresponding rotational speed sensor RS (3) The temperature of the motor 28 of the corresponding thruster measured by the corresponding temperature sensor TS.

More specifically, the malfunction determiner 32 determines whether there is a malfunction in at least one of the thrusters 21 to 26 while at least one pair of thrusters in the thrusters 21 to 26 are functioning normally.

The attitude detector 33 is operative to detect the tilt of the vehicle body 11 about each of the pitch axis, the roll axis, and the yaw axis based on the measured acceleration and measured angular velocity about each of the pitch axis, roll axis, and yaw axis of the aerial vehicle 10. The attitude detector 33 is also operative to detect the flight attitude of the aerial vehicle 10 based on the detected tilt of the vehicle body 11 about each of the pitch axis, the roll axis, and the yaw axis.

The above malfunction determining method of the malfunction determiner 32 described in the first embodiment is an example of various malfunction determining methods usable by the malfunction determiner 32. Similarly, the above flight attitude detecting method of the attitude detector 33 described in the first embodiment is an example of various flight attitude detecting methods usable by the attitude detector 33.

The flight controller 34 controls the electrical power output from the power source 37, and individually supplies the controlled electrical power to the motors 28. This activates the thrusters 21 to 26, and individually controls the rotational speed of each of the motors 28, i.e. the rotational speed of each of the propellers 27, thus controlling how the aerial vehicle 10 operates.

Specifically, the flight controller 34 individually controls the rotational speed of each of the motors 28, i.e. the rotational speed of each of the propellers 27, thus adjusting
1. The flight attitude of the aerial vehicle 10 to be stable
2. The flight direction of the aerial vehicle 10
3. The flight speed of the aerial vehicle 10.

For example, reducing the rotational speed of the motor 28 of the thruster 26 and the rotational speed of the motor 28 of the thruster 21 as compared with the rotational speed of the motor 28 of each of the remaining thrusters enables the aerial vehicle 10A to go toward one side of the roll axis, which is closer to the thrusters 26 and 21 than the other side of the roll axis is.

For example, the flight controller 34 wirelessly communicates with an unillustrated controller of a user, and controls the rotational speed of each of the motors 28, i.e. the rotational speed of each of the propellers 27, in accordance with the user's instructions sent from the controller.

In particular, if it is determined by the malfunction determiner 32 that there is a malfunction in one of the thrusters 21 to 26, the flight controller 34 controls the rotational speed of each of the motors 28 of the thrusters 21 to 26 including a malfunctioned thruster. This control makes the flight attitude of the aerial vehicle 10 stable while ensuring the safety of the aerial vehicle 10.

For example, the flight attitude of the aerial vehicle 10 being stable is that the aerial vehicle 10 is in a horizontal position such that the top and bottom surfaces 11a and 11b of the vehicle body 11 of the aerial vehicle 10 extend horizontally.

Specifically, if it is determined that there is a malfunction in one of the thrusters 21 to 26 by the malfunction determiner 32, the flight controller 34
1. Deactivates the malfunctioned thruster, i.e. the motor 28 of the malfunctioned thruster
2. Deactivates the thruster, which is opposite and paired to the malfunctioned thruster
3. Controls the output of each of the normal, i.e. active thrusters to make the flight attitude of the aerial vehicle 10 stable.

Figure 4:
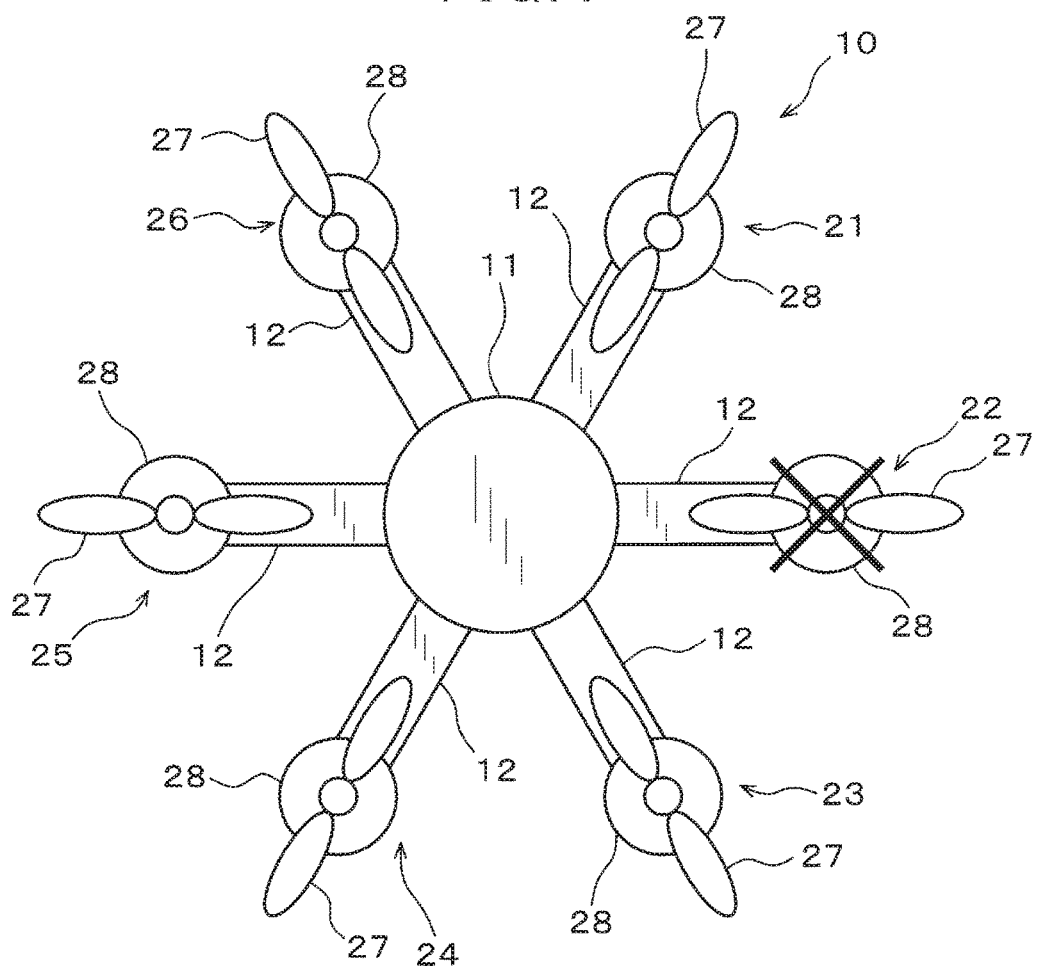
FIG. 4 is a structural view of the aerial vehicle in which there is a malfunction in one of thrusters of the aerial vehicle illustrated in FIG. 1.
Figure 5:
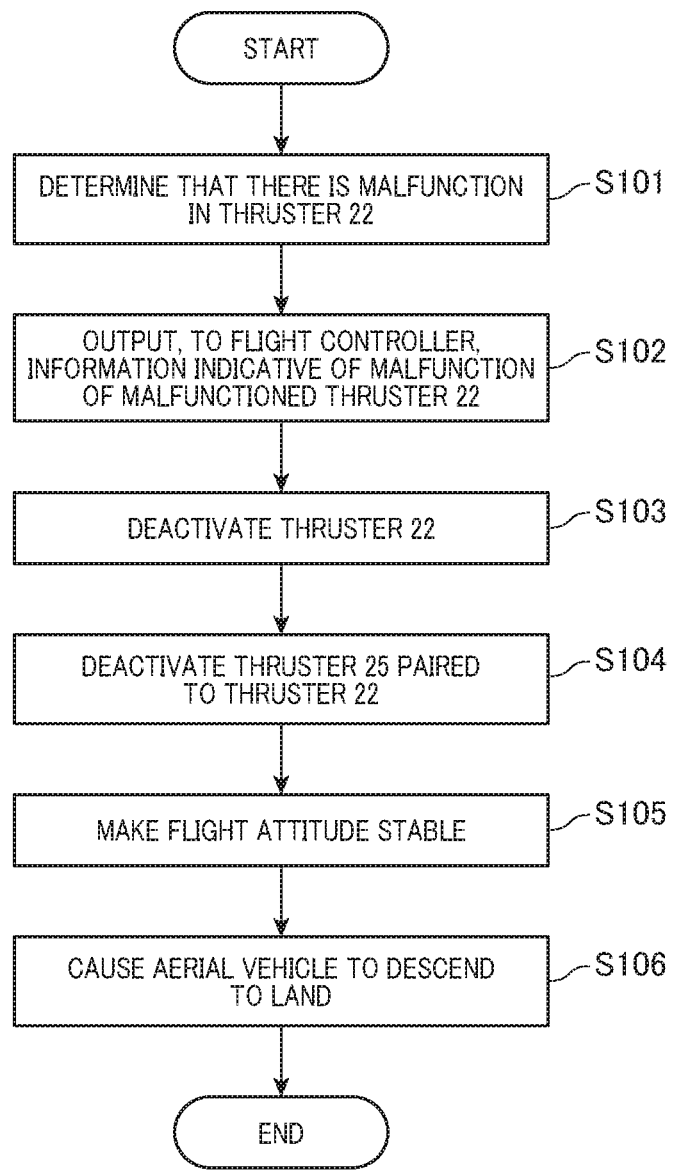
FIG. 5 is a flowchart schematically illustrating a safety routine carried out by the control unit of the aerial vehicle illustrated in FIG. 3.

For example, if it is determined that there is a malfunction in the thruster 22 by the malfunction determiner 32 as illustrated in FIG. 4, the flight controller 34
1. Deactivates the malfunctioned thruster 22 (see cross mark on the malfunctioned thruster 22)
2. Deactivates the thruster 25, which is opposite and paired to the malfunctioned thruster 22
3. Controls the output of each of the normal, i.e. active thrusters 21, 23, 24, and 26, i.e. the rotational speed of each of the motors 28 of the active thrusters 21, 23, 24, and 26, thus making the flight attitude of the aerial vehicle 10 stable.

This control prevents torque based on the thrusters 21 to 26 from being unbalanced, thus maintaining the flight attitude of the aerial vehicle 10 being stable.

The flight controller 34 performs a landing task while maintaining the flight attitude of the aerial vehicle 10 stable. The landing task individually controls the output of each of the remaining thrusters 21, 23, 14, and 26, i.e. the rotational speed of each of the motors 28 of the remaining thrusters 21, 23, 24, and 26. That is, this controls the aerodynamic force generated by each of the motors 28 of the remaining thrusters 21, 23, 24, and 26. This enables the aerial vehicle 10 to safely land on a desired place while the flight attitude of the aerial vehicle 10 is kept stable.

Next, the following describes how the control unit 30 of the aerial vehicle 10 operates in accordance with a safety routine as illustrated in FIG. 4.

If there is a malfunction in, for example, the thruster 22, the malfunction determiner 32 determines that there is a malfunction in the thruster 22 as a function of, for example, at least one of 1. The electrical parameter indicative of the electrical power supplied from the motor 28 of the thruster 22

2. The rotational speed of the motor 28 of the thruster 22 measured by the corresponding rotational speed sensor RS (3) The temperature of the motor 28 of the thruster 22 measured by the corresponding temperature sensor TS in step S101.

Then, the malfunction determiner 32 outputs, to the flight controller 34, information representing that there is a malfunction in the thruster 22 in step S102; the thruster 22 is called a malfunctioned thruster 22.

The flight controller 34 deactivates the malfunctioned thruster 22 in response to receiving the information sent from the malfunction determiner 32 in step S103.

In parallel with the operation in step S103, the flight controller 34 deactivates the thruster 25, which is opposite and paired to the malfunctioned thruster 22 in step S104.

Making the pair of thrusters 22 and 25 inactive leads to reduction of the aerodynamic force applied to the aerial vehicle 10.

Following the operation in step S104, the flight controller 34 controls, based on the flight attitude of the aerial vehicle 10 detected by the attitude detector 33, the rotational speed of each of the motors 28 of the normal, i.e. active thrusters 21, 23, 24, and 26 in step S105. This operation in step S105 makes the flight attitude of the aerial vehicle 10 stable. That is, controlling aerodynamic force generated by each of the active thrusters 21, 23, 24, and 26 enables the flight attitude of the aerial vehicle 10 to be stable in step S105.

Following or in parallel with the operation in step S105, the flight controller 34 performs the landing task while maintaining the flight attitude of the aerial vehicle 10 stable based on the flight attitude of the aerial vehicle 10 detected by the attitude detector 33 in step S106. Specifically, the flight controller 34 gradually reduces the rotational speed of each of the motors 28 of the normal thrusters 21, 23, 24, and 26 while maintaining the flight attitude of the aerial vehicle 10 stable based on the flight attitude of the aerial vehicle 10 detected by the attitude detector 33 in step S106. This causes the aerial vehicle 10 to gradually descend so as to land on a desired place while maintaining the flight attitude of the aerial vehicle 10 being stable.

As described above, the aerial vehicle 10 according to the first embodiment is configured such that the flight controller 34 controls the aerodynamic force generated by each of the active thrusters when it is determined that there is a malfunction in one of the thrusters 21 to 26. Specifically, the flight controller 34 deactivates the malfunctioned thruster and the thruster, which is opposite and paired to the malfunctioned thruster. This prevents aerodynamic force based on the thrusters 21 to 26 from being unbalanced due to deactivation of the malfunctioned thruster, thus making the flight attitude of the aerial vehicle 10 stable. The flight controller 34 also causes the aerial vehicle 10 to land on a desired place while maintaining the flight attitude of the aerial vehicle being stable.

That is, the aerial vehicle 10 according to the first embodiment enables the flight attitude of the aerial vehicle 10 to be stable while ensuring the safety of the aerial vehicle 10 even if there is a malfunction in one of the thrusters 21 to 26.

Second Embodiment

Next, the following describes an aerial vehicle 10A according to the second embodiment of the present disclosure.

The structures and/or functions of the aerial vehicle 10A according to the second embodiment are different from those of the aerial vehicle 10 according to the first embodiment by the following points. So, the following mainly describes the different points, and omits or simplifies descriptions of like parts between the first and second embodiments, to which identical or like reference characters are assigned, thus eliminating redundant descriptions.

Figure 6:
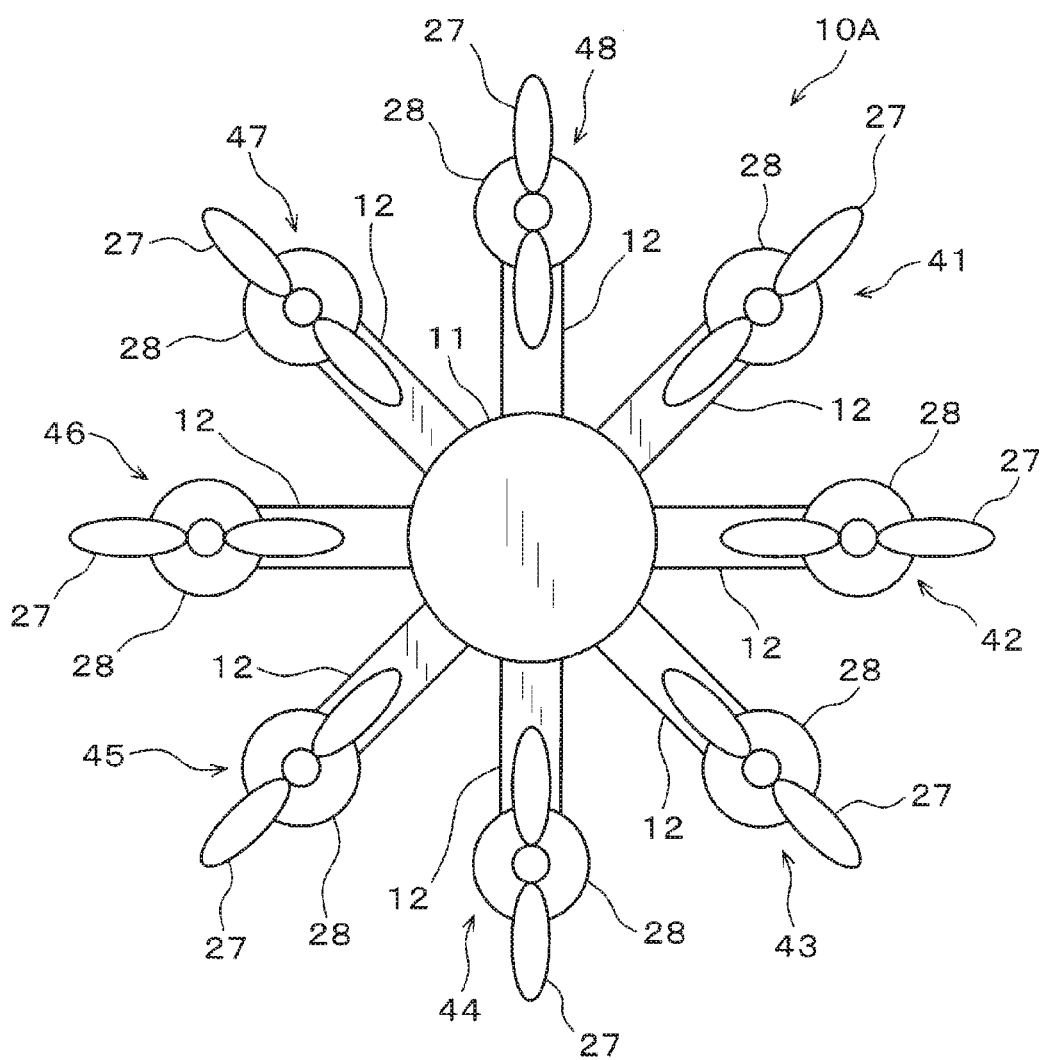
FIG. 6 is a structural view schematically illustrating the aerial vehicle according to the second embodiment of the present disclosure.

Referring to FIG. 6, the aerial vehicle 10A includes the vehicle body 11 and eight arms 12 having identical configurations. Similar to the first embodiment, the eight arms 12 radially extend from the circumferential side surface of the vehicle body 11 while having regular intervals therebetween. In other words, the eight arms 12 radially extend from the circumferential side surface of the vehicle body 11 to be symmetrical with each other with respect to the vehicle body 11.

Like the first embodiment, the eight arms 12 include four pairs of arms 12. The arms 12 of each pair extend from the vehicle body 11 in the respective opposite directions on the corresponding same radial line passing through the center of gravity of the aerial vehicle 10.

Like the first embodiment, the aerial vehicle 10A includes thrusters 41 to 48. Each of the thrusters 41 to 48 is mounted on the second end of the corresponding one of the arms 12. Each of the thrusters 41 to 48 includes a propeller 27 and a motor 28. Like the first embodiment, the motor 28 of each thruster 41 to 48 is mounted on the second end of the corresponding arm 12. The propeller 27 of each thruster 41 to 48 is provided on the corresponding motor 28 to be rotatable about a rotational axis of the corresponding motor 28; the rotational axis is parallel to the center axis of the cylindrical vehicle body 11. That is, each of the motors 28 turns the corresponding propeller 27, thus generating aerodynamic force including aerodynamic lift and/or thrust force.

The thrusters 41 and 45 are provided to the corresponding pair of arms 12, so that the thrusters 41 and 45 are paired and opposite to each other, and the thrusters 42 and 46 are provided to the corresponding pair of arms 12, so that the thrusters 42 and 46 are paired and opposite to each other. Additionally, the thrusters 43 and 47 are provided to the corresponding pair of arms 12, so that the thrusters 43 and 47 are paired to each other, and the thrusters 44 and 48 are provided to the corresponding pair of arms 12, so that the thrusters 44 and 48 are paired to each other.

Figure 7:
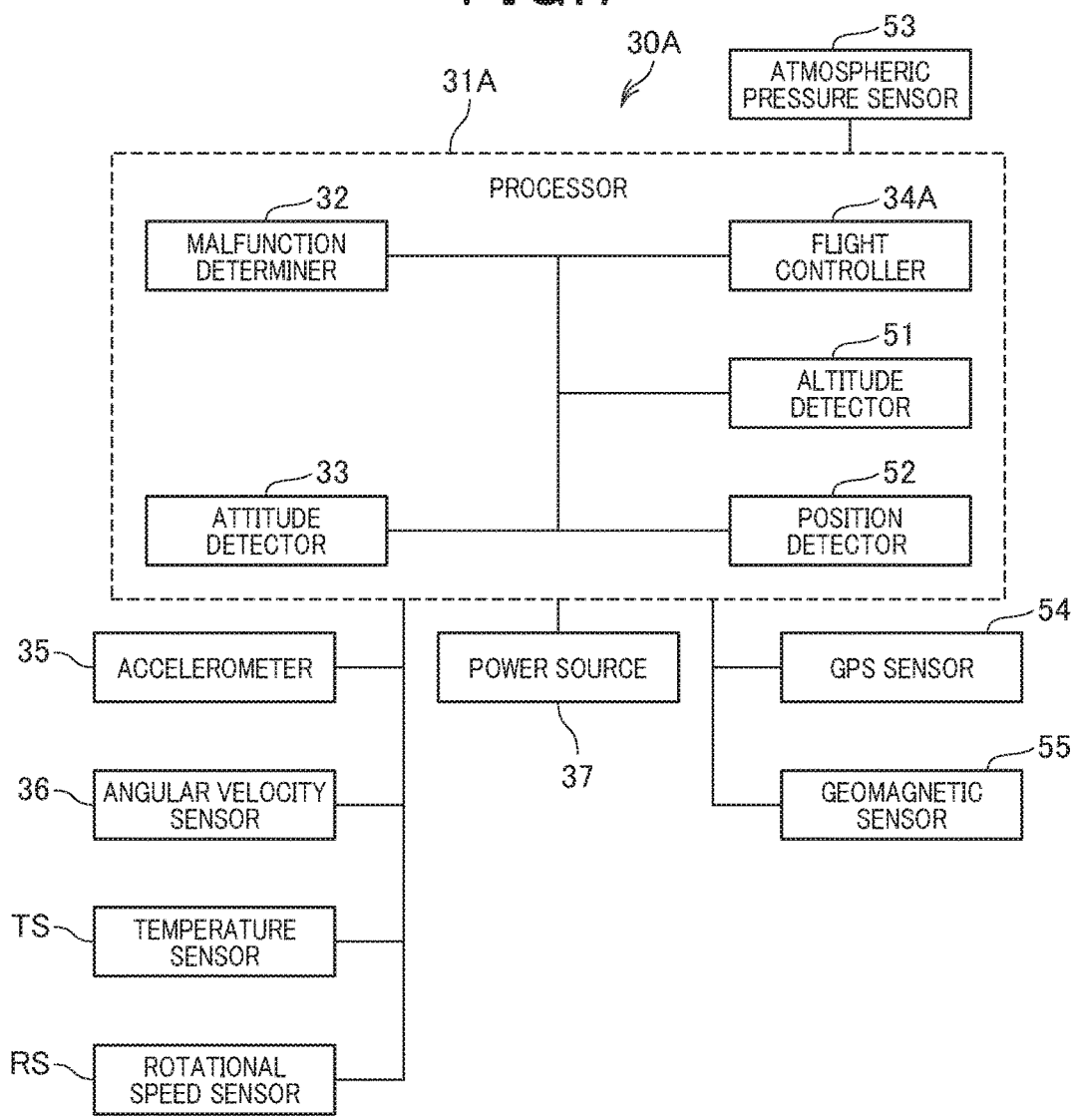
FIG. 7 is a schematic block diagram mainly illustrating an example of the structure of the control unit illustrated in FIG. 6.

Referring to FIG. 7, the aerial vehicle 10A includes a control unit 30A installed in the vehicle body 11 for controlling the overall operations of the aerial vehicle 10A.

The control unit 30A includes a processor 31A comprised of, for example, a microcomputer. The processor 31A includes essentially, for example, a CPU and a memory equipped with a ROM and a RAM, and its peripheral circuits.

The control unit 30A includes an altitude detector 51, a position detector 52, an atmospheric pressure sensor 53, a global positioning system (GPS) sensor 54, and a geomagnetic sensor 55 in addition to the malfunction determiner 32, attitude detector 33, accelerometers 35, angular velocity sensors 36, power source 37, temperature sensors TS, and rotational speed sensors RS.

The control unit 30A also includes a flight controller 34A, which is slightly different in function from the flight controller 34.

For example, the processor 31A runs programs stored in the memory to implement the malfunction determiner 32, the attitude detector 33, the flight controller 34A, the altitude detector 51, and the position detector 52. For example, the modules 32, 33, 34A, 51, and 52 can be implemented in the control unit 30A as hardware units and/or hardware-software hybrid units.

The atmospheric pressure sensor 53 is communicably connected to the processor 31A, and is operative to measure atmospheric pressure around the aerial vehicle 10A.

The GPS sensor 54 is communicably connected to the processor 31A, and is operative to measure the three-dimensional location of the aerial vehicle 10A.

The geomagnetic sensor 55 is communicably connected to the processor 31A, and is operative to measure the geomagnetism of the actual location of the aerial vehicle 10A.

Like the first embodiment, the malfunction determiner 32 determines whether there is a malfunction in one of the thrusters 41 to 48.

The altitude detector 51 is operative to detect the flight altitude, i.e. flight level, of the aerial vehicle 10A. Specifically, the altitude detector 51 is operative to detect the flight altitude of the aerial vehicle 10A as a function of the atmospheric pressure measured by the atmospheric pressure sensor 53.

For example, the altitude detector 51 detects the flight altitude of the aerial vehicle 10A using a correlation between values of the flight altitude of the aerial vehicle 10A and corresponding values of the atmospheric pressure.

The position detector 52 is operative to detect the flight position of the aerial vehicle 10A.

Specifically, the position detector 52 is operative to detect the flight position, i.e. the actual longitude and latitude, of the aerial vehicle 10A as the flight position of the aerial vehicle 10A as a function of the output of the GPS sensor 54 and the output of the geomagnetic sensor 55. For example, the position detector 52 is operative to detect the flight position of the aerial vehicle 10A based on a value of the three-dimensional location of the aerial vehicle 10A measured by the GPS sensor 54 and a value of the geomagnetism of the actual location of the aerial vehicle 10A measured by the geomagnetic sensor 55.

The above flight altitude detecting method of the altitude detector 51 described in the second embodiment is an example of various flight altitude detecting methods usable by the altitude detector 51. The above flight position detecting method of the position detector 52 described in the second embodiment is an example of various flight position detecting methods usable by the position detector 52.

The flight controller 34A controls the electrical power output from the power source 37, and individually supplies the controlled electrical power to the motors 28. This activates the thrusters 21 to 26, and individually controls the rotational speed of each of the motors 28, i.e. the rotational speed of each of the propellers 27, thus adjusting 1. The flight attitude of the aerial vehicle 10A to be stable
2. The flight direction of the aerial vehicle 10A
3. The flight speed of the aerial vehicle 10A.

In particular, if it is determined that there is a malfunction in one of the thrusters 41 to 48 by the malfunction determiner 32, the flight controller 34A controls the rotational speed of each of the motors 28 of the thrusters 41 to 48 including a malfunctioned thruster. This control makes the flight attitude of the aerial vehicle 10A stable while ensuring the safety of the aerial vehicle 10A.

Specifically, if it is determined that there is a malfunction in one of the thrusters 41 to 48 by the malfunction determiner 32, the flight controller 34A 1. Deactivates the malfunctioned thruster, i.e. the motor 28 of the malfunctioned thruster
2. Deactivates the thruster, which is opposite and paired to the malfunctioned thruster
3. Controls the rotational speed of each of the motors 28 of the normal, i.e. active thrusters to make the flight attitude of the aerial vehicle 10A stable.

Figure 8:
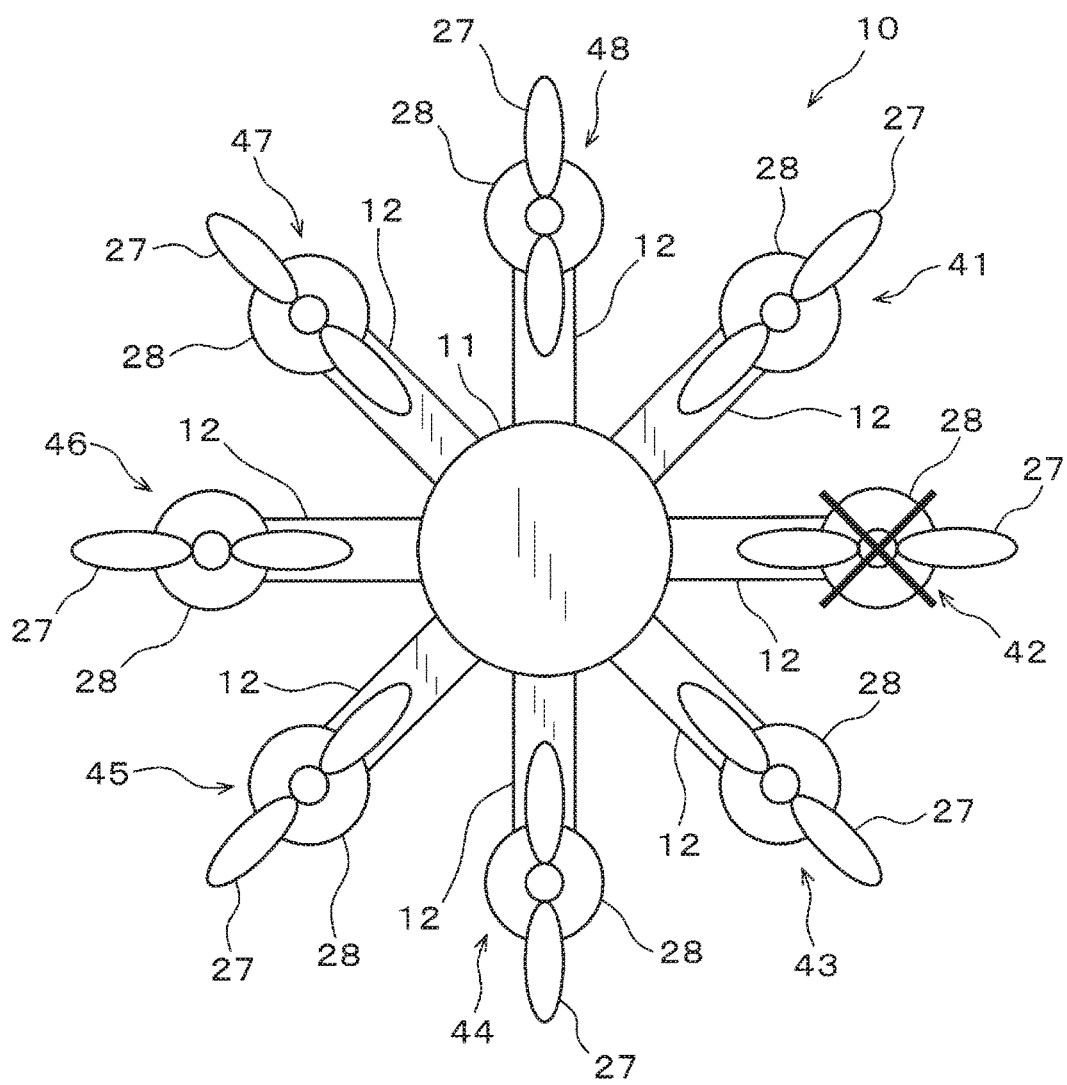
FIG. 8 is a structural view of the aerial vehicle illustrated in FIG. 6 in which there is a malfunction in one of thrusters of the aerial vehicle illustrated in FIG. 6.

For example, if it is determined that there is a malfunction in the thruster 42 by the malfunction determiner 32 as illustrated in FIG. 8, the flight controller 34A 1. Deactivates the malfunctioned thruster 42
2. Deactivates the thruster 46, which is opposite and paired to the malfunctioned thruster 42.

This control prevents torque output from the whole of the thrusters 41 to 48 from being unbalanced, thus maintaining the flight attitude of the aerial vehicle 10A being stable.

After deactivation of the paired thrusters 42 and 46, the flight controller 34A increases the output of each of the active thrusters 41, 43, 44, 45, 47, and 48 to be higher than a corresponding present output level. In other words, the flight controller 34A increases the aerodynamic force generated by each of the active thrusters 41, 43, 44, 45, 47, and 48, i.e. the rotational speed of each of the motors 28 of the active thrusters 41, 43, 44, 45, 47, and 48, to be higher than a corresponding present output level.

For example, after deactivation of the paired thrusters 42 and 46, the flight controller 34A increases the output of each of the active thrusters 41, 43, 44, 45, 47, and 48 up to its maximum level. In other words, the flight controller 34A increases the aerodynamic force generated by each of the active thrusters 41, 43, 44, 45, 47, and 48, i.e. the rotational speed of each of the motors 28 of the active thrusters 41, 43, 44, 45, 47, and 48, up to its maximum level, i.e. its upper limit.

Specifically, the flight controller 34A increases the electrical power, such as the current, output from the power source 37 and supplied to each of the motors 28 of the active thrusters 41, 43, 44, 45, and 47, up to its maximum level. This increases the rotational speed of each of the motors 28 of the active thrusters 41, 43, 44, 45, 47, and 48 up to its upper limit.

Thereafter, the flight controller 34A obtains how the flight altitude of the aerial vehicle 10A has changed since the increasing of the output of each of the active thrusters 41, 43, 44, 45, 47, and 48. Then, the flight controller 34A determines whether the flight altitude of the aerial vehicle 10A has increased since the increasing of the output of each of the active thrusters 41, 43, 44, 45, 47, and 48. In other words, the flight controller 34A determines whether the total aerodynamic lift generated by the active thrusters 41, 43, 44, 45, 47, and 48 is greater than the payload of the aerial vehicle 10A.

Upon determining that the flight altitude of the aerial vehicle 10A has increased since the increasing of the output of each of the active thrusters 41, 43, 44, 45, 47, and 48, the flight controller 34A determines that the aerial vehicle 10A has enough remaining ability to continuously fly by the active thrusters 41, 43, 44, 45, 47, and 48. Then, the flight controller 34A performs a continuous flying task while maintaining the flight attitude of the aerial vehicle 10A stable. The continuous flying task individually controls the rotational speed of each of the motors 28 of the remaining thrusters 41, 43, 44, 45, 47, and 48 based on the flight position of the aerial vehicle 10A measured by the position sensor 52, thus flying the aerial vehicle 10A up to a predetermined safe place. The predetermined safe place is for example selected by a user of the aerial vehicle 10A from one of 1. A departure place from which the aerial vehicle 10A has started
2. A predetermined destination of the aerial vehicle 10A
3. A predetermined evacuation place prepared for evacuation of the aerial vehicle 10A.

As described above, the flight controller 34A performs the continuous flying task to continuously fly the aerial vehicle 10A up to the predetermined safe place upon determining that the aerial vehicle 10A has enough remaining ability to continuously fly by the active thrusters 41, 43, 44, 45, 47, and 48.

On the other hand, upon determining that the flight altitude of the aerial vehicle 10A has decreased since the increasing of the output of each of the active thrusters 41, 43, 44, 45, 47, and 48, the flight controller 34A determines that the aerial vehicle 10A has insufficient remaining ability to continuously fly by the active thrusters 41, 43, 44, 45, 47, and 48. Then, the flight controller 34A performs a landing task, which has been described in the first embodiment, independently of the present altitude of the aerial vehicle 10A while maintaining the flight attitude of the aerial vehicle 10A being stable. That is, the flight controller 34A performs the landing task while maintaining the stable flight attitude of the aerial vehicle 10A upon determining that the aerial vehicle 10A has insufficient remaining ability to continuously fly by the active thrusters 41, 43, 44, 45, 47, and 48.

Figure 9:
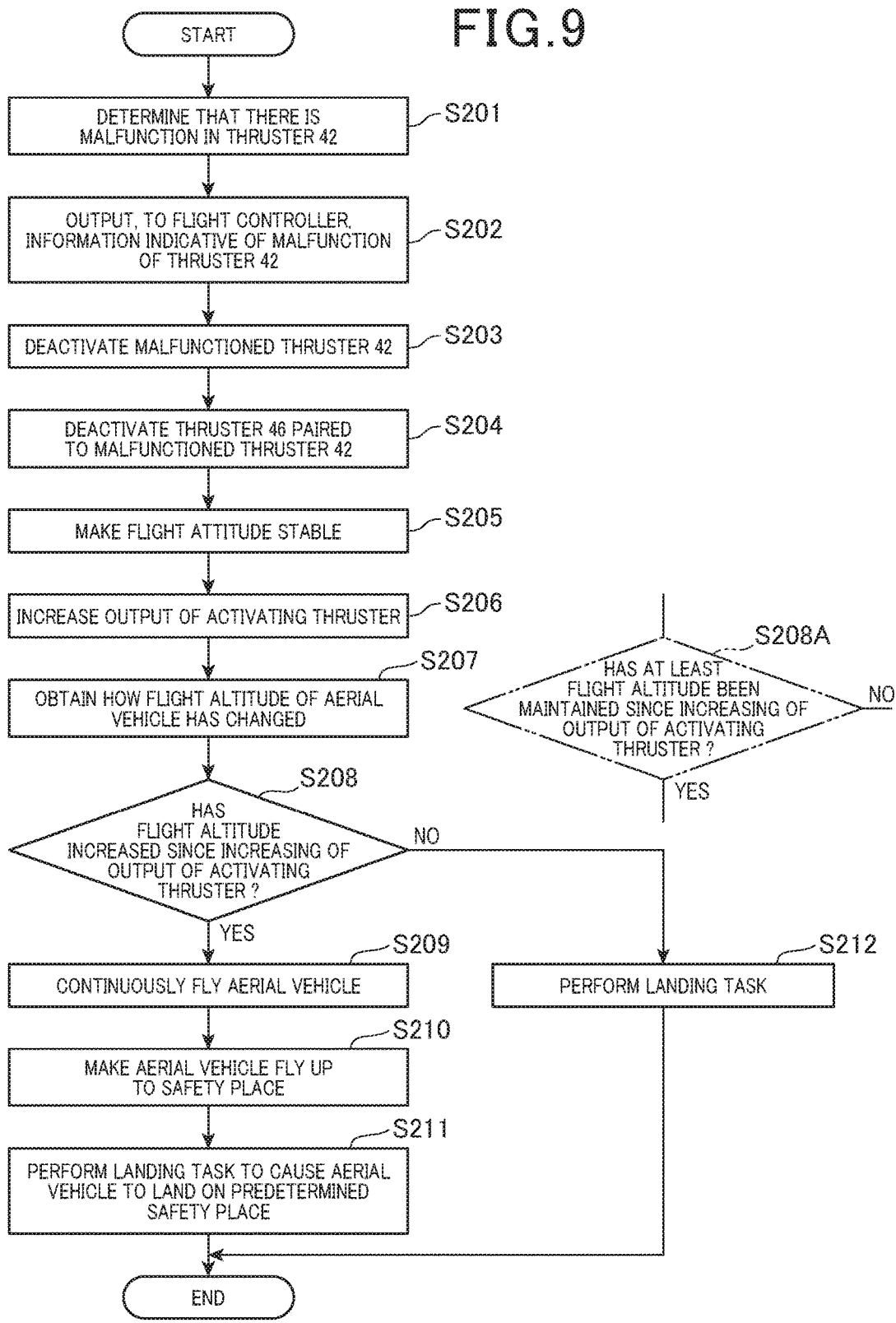
FIG. 9 is a flowchart schematically illustrating a safety routine carried out by the control unit of the aerial vehicle illustrated in FIG. 7.

Next, the following describes a first example of how the control unit 30 of the aerial vehicle 10A operates in accordance with a safety routine illustrated in FIG. 9.

If there is a malfunction in the thruster 42, the malfunction determiner 32 determines that there is a malfunction in the thruster 42 as a function of, for example, at least one of 1. The electrical parameter indicative of the electrical power supplied from the motor 28 of the thruster 42
2. The rotational speed of the motor 28 of the thruster 42 measured by the corresponding rotational speed sensor RS
(3) The temperature of the motor 28 of the thruster 42 measured by the corresponding temperature sensor TS in step S201.

Then, the malfunction determiner 32 outputs, to the flight controller 34A, information representing that there is a malfunction in the thruster 42 in step S202; the thruster 42 is called a malfunctioned thruster 42.

The flight controller 34A deactivates the malfunctioned thruster 42 in response to receiving the information sent from the malfunction determiner 32 in step S203.

In parallel with the operation in step S203, the flight controller 34A deactivates the thruster 46, which is opposite and paired to the malfunctioned thruster 42 in step S204.

Making the pair of thrusters 42 and 46 inactive leads to reduction of the aerodynamic force applied to the aerial vehicle 10A.

Following the operation in step S204, the flight controller 34A controls, based on the flight attitude of the aerial vehicle 10A detected by the attitude detector 33, the rotational speed of each of the motors 28 of the normal, i.e. active thrusters 41, 43, 44, 45, 47, and 48 in step S205. This operation in step S205 makes the flight attitude of the aerial vehicle 10A stable. That is, controlling aerodynamic force generated by each of the active thrusters 41, 43, 44, 45, 47, and 48 enables the flight attitude of the aerial vehicle 10A to be stable in step S205.

Next, the flight controller 34A increases the output of each of the active thrusters 41, 43, 44, 45, 47, and 48 up to its maximum level while keeping the flight attitude of the aerial vehicle 10A stable in step S206. Then, the flight controller 34A obtains how the flight altitude of the aerial vehicle 10A detected by the altitude detector 51 has changed since the increasing of the output of each of the active thrusters 41, 43, 44, 45, 47, and 48 in step S207.

Then, the flight controller 34A determines whether the flight altitude of the aerial vehicle 10A has increased since the increasing of the output of each of the active thrusters 41, 43, 44, 45, 47, and 48 in step S208.

Upon determining that the flight altitude of the aerial vehicle 10A has increased since the increasing of the output of each of the active thrusters 41, 43, 44, 45, 47, and 48 (YES in step S208), the flight controller 34A performs the continuous flying task while maintaining the flight attitude of the aerial vehicle 10A stable in step S209. Then, the flight controller 34A makes the aerial vehicle 10A fly to the predetermined safe place in accordance with the flight position of the aerial vehicle 10A detected by the position detector 52 in step S210.

When it is determined that the actual flight position of the aerial vehicle 10A is close to the predetermined safe place in accordance with the flight position of the aerial vehicle 10A detected by the position detector 52, the flight controller 34A performs the landing task while maintaining the flight attitude of the aerial vehicle 10A stable in step S211. This results in the aerial vehicle 10A safely landing on the predetermined safe place.

Otherwise, upon determining that the flight altitude of the aerial vehicle 10A has decreased since the increasing of the output of each of the active thrusters 41, 43, 44, 45, 47, and 48 (NO in step S208), the flight controller 34A performs the landing task independently of the present altitude of the aerial vehicle 10A while maintaining the flight attitude of the aerial vehicle 10A being stable in step S212. This results in the aerial vehicle 10A descending and landing on an unexpected place without flying of the aerial vehicle 10A to the predetermined safe place.

As described above, the above configuration of the aerial vehicle 10A according to the second embodiment enables the aerial vehicle 10A to continuously fly or land even if the paired thrusters 42 and 46 are malfunctioned.

In step S208, the flight controller 34A determines whether the flight altitude of the aerial vehicle 10A has increased since the increasing of the output of each of the active thrusters 41, 43, 44, 45, 47, and 48. This enables the aerial vehicle 10A to go in any radial direction of the vehicle body 11 while maintaining the aerial vehicle 10A at the present altitude of the aerial vehicle 10A.

As another operation in place of the operation in step S208, the flight controller 34A can determine whether the flight altitude of the aerial vehicle 10A at least has been maintained since the increasing of the output of each of the active thrusters 41, 43, 44, 45, 47, and 48 in step S208A (see FIG. 9).

Upon determining that the flight altitude of the aerial vehicle 10A at least has been maintained since the increasing of the output of each of the active thrusters 41, 43, 44, 45, 47, and 48 (YES in step S208A), the flight controller 34A determines that the aerial vehicle 10A has enough remaining ability to continuously fly by the active thrusters 41, 43, 44, 45, 47, and 48. Then, the flight controller 34A performs the continuous flying task while maintaining the flight attitude of the aerial vehicle 10A stable (see step S209).

Otherwise, upon determining that the flight altitude of the aerial vehicle 10A has not been maintained since the increasing of the output of each of the active thrusters 41, 43, 44, 45, 47, and 48 (NO in step S208A), the flight controller 34A determines that the aerial vehicle 10A has insufficient remaining ability to continuously fly by the active thrusters 41, 43, 44, 45, 47, and 48. Then, the flight controller 34A performs the landing task independently of the present altitude of the aerial vehicle 10A while maintaining the flight attitude of the aerial vehicle 10A being stable (see step S211).

Figure 10:
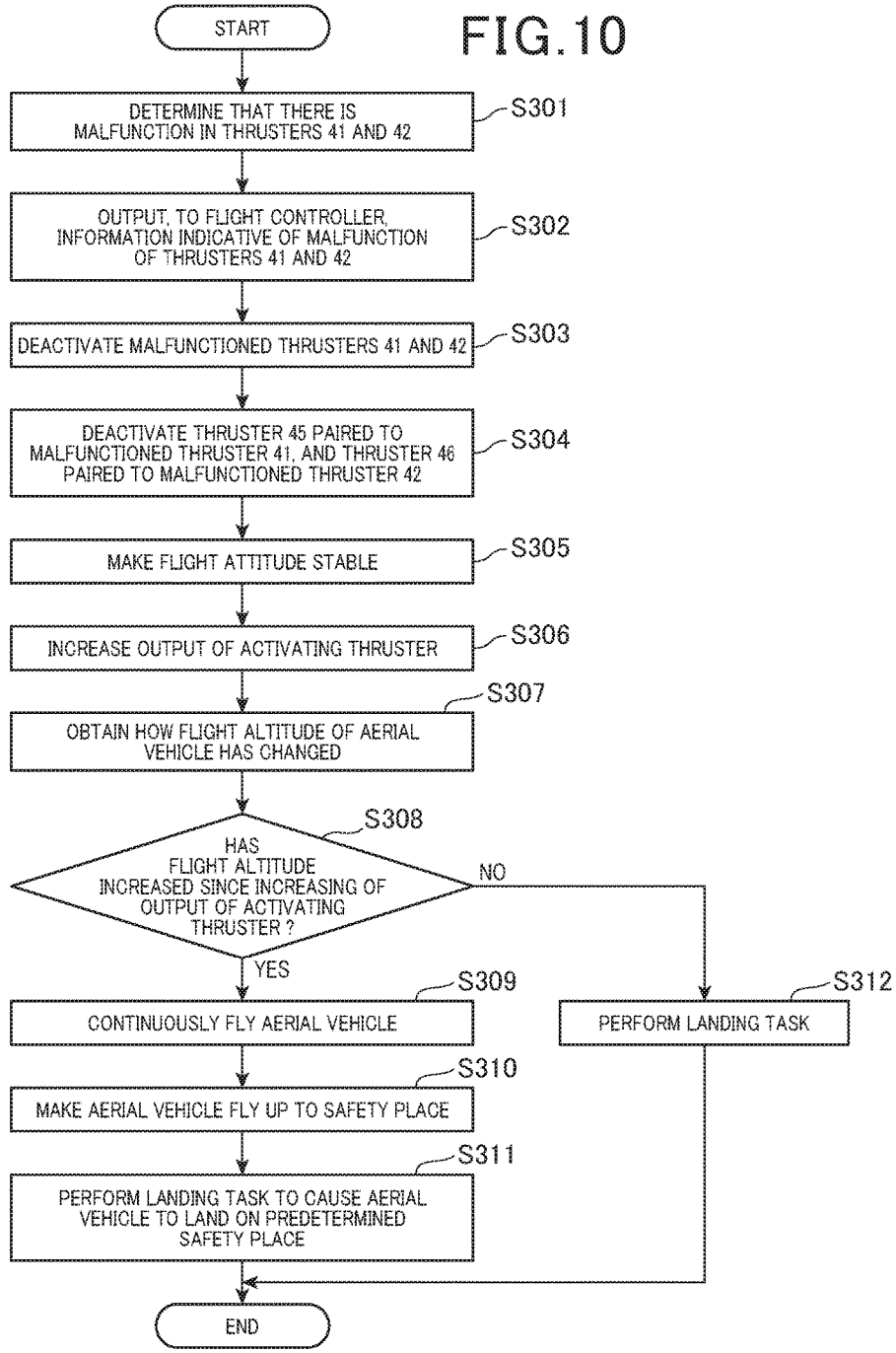
FIG. 10 is a flowchart schematically illustrating another safety routine carried out by the control unit of the aerial vehicle illustrated in FIG. 7.
Figure 11:
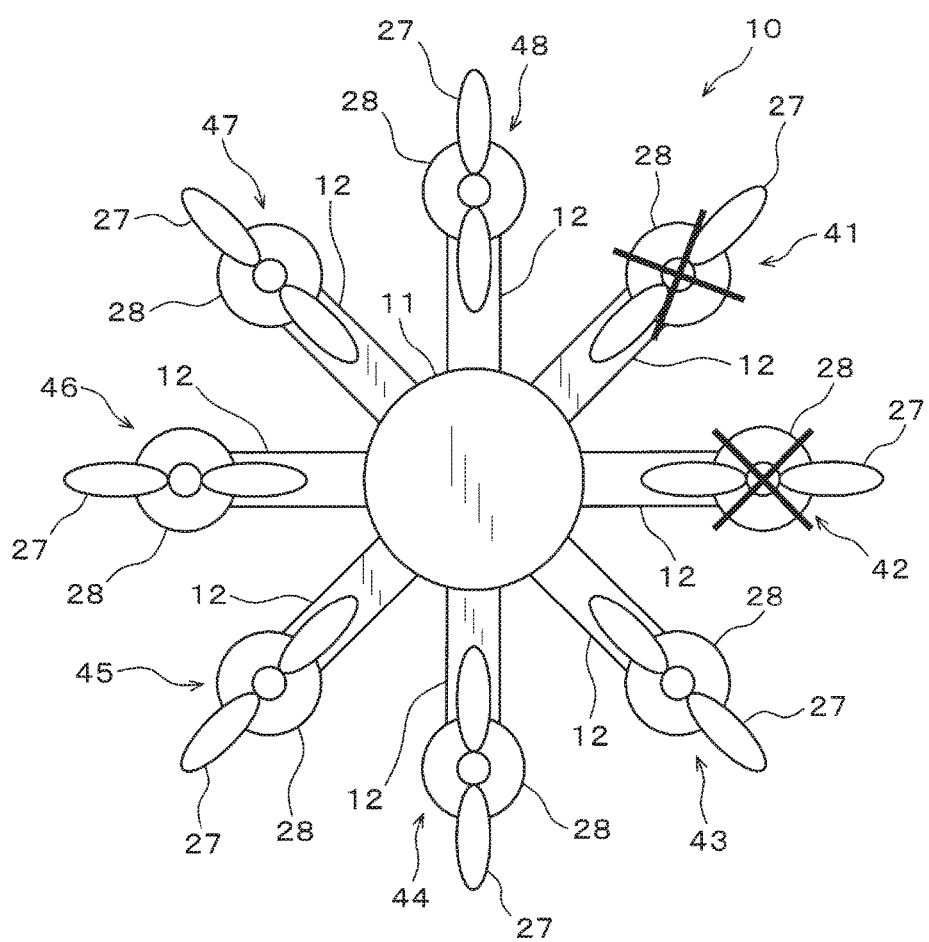
FIG. 11 is a structural view of the aerial vehicle illustrated in FIG. 6 in which there are malfunctions in two of the thrusters of the aerial vehicle illustrated in FIG. 6.

Next, the following describes a second example of how the control unit 30 of the aerial vehicle 10A operates in accordance with another safety routine illustrated in FIG. 10. As illustrated in FIG. 11, there is a case where two thrusters 41 and 42 are malfunctioned. That is, FIG. 10 schematically illustrates how the control unit 30 of the aerial vehicle 10A operates if there are malfunctions in the respective thrusters 41 and 42. The following mainly describes operations of the flight controller 34A according to the second example, which are different from the operations of the flight controller 34A according to the first example illustrated in FIG. 9. Descriptions of operations of the flight controller 34A according to the second example, which are substantially identical to the corresponding operations of the flight controller 34A according to the first example illustrated in FIG. 9, are omitted or simplified.

If there are malfunctions in, for example, the thrusters 41 and 42, the malfunction determiner 32 determines that there is a malfunction in each of the thrusters 41 and 42 as a function of, for example, at least one of 1. The electrical parameter indicative of the electrical power supplied from the motor 28 of the corresponding one of the thrusters 41 and 42

2. The rotational speed of the motor 28 of the corresponding one of the thrusters 41 and 42

3. The temperature of the motor 28 of the corresponding one of the thrusters 41 and 42.

Then, the malfunction determiner 32 outputs, to the flight controller 34A, information representing that there are malfunctions in the respective thrusters 41 and 42 in step S302; the thrusters 41 and 42 are called malfunctioned thrusters 41 and 42. The thrusters 41 and 42 can be simultaneously or sequentially malfunctioned.

The flight controller 34A deactivates the malfunctioned thrusters 41 and 42 in response to receiving the information sent from the malfunction determiner 32 in step S303.

In parallel with the operation in step S303, the flight controller 34A deactivates the thrusters 45 and 46 in step S304; the thruster 46 is opposite and paired to the malfunctioned thruster 42, and thruster 45 is opposite and paired to the malfunctioned thruster 41.

Following the operation in step S304, the flight controller 34A controls, based on the flight attitude of the aerial vehicle 10A detected by the attitude detector 33, the rotational speed of each of the motors 28 of the normal, i.e. active thrusters 43, 44, 45, 47, and 48 in step S305. This operation in step S305 makes the flight attitude of the aerial vehicle 10A stable.

Next, the flight controller 34A increases the output of each of the active thrusters 43, 44, 45, 47, and 48 up to its maximum level while keeping the flight attitude of the aerial vehicle 10A stable in step S306. Then, the flight controller 34A obtains how the flight altitude of the aerial vehicle 10A detected by the altitude detector 51 has changed since the increasing of the output of each of the active thrusters 43, 44, 45, 47, and 48 in step S307.

Then, the flight controller 34A determines whether the flight altitude of the aerial vehicle 10A has increased since the increasing of the output of each of the active thrusters 43, 44, 45, 47, and 48 in step S308.

Upon determining that the flight altitude of the aerial vehicle 10A has increased since the increasing of the output of each of the active thrusters 43, 44, 45, 47, and 48 (YES in step S308), the flight controller 34A performs the continuous flying task while maintaining the flight attitude of the aerial vehicle 10A stable in step S309. Then, the flight controller 34A makes the aerial vehicle 10A fly to the predetermined safe place in accordance with the flight position of the aerial vehicle 10A detected by the position detector 52 in step S310.

When it is determined that the actual flight position of the aerial vehicle 10A is close to the predetermined safe place in accordance with the flight position of the aerial vehicle 10A detected by the position detector 52, the flight controller 34A performs the landing task while maintaining the flight attitude of the aerial vehicle 10A stable in step S311. This results in the aerial vehicle 10A safely landing on the predetermined safe place.

Otherwise, upon determining that the flight altitude of the aerial vehicle 10A has decreased since the increasing of the output of each of the active thrusters 43, 44, 45, 47, and 48 (NO in step S308), the flight controller 34A performs the landing task independently of the present altitude of the aerial vehicle 10A while maintaining the flight attitude of the aerial vehicle 10A being stable in step S312. This results in the aerial vehicle 10A descending and landing on an unexpected place without flying of the aerial vehicle 10A to the predetermined safe place.

As described above, the above configuration of the aerial vehicle 10A according to the second embodiment enables the aerial vehicle 10A to continuously fly or land even if the pair of thrusters 42 and 46 and the pair of thrusters 41 and 45 are malfunctioned.

In particular, after start of the continuously flying of the aerial vehicle 10A, the flight controller 34A according to the second embodiment is configured to 1. Determine whether the aerodynamic lift generated by all the active thrusters is greater than the payload of the aerial vehicle 10A 2. Continuously fly the aerial vehicle 10A as long as at least one pair of thrusters are activated and the aerial vehicle 10A has enough remaining ability to continuously fly by the at least one active thrusters.

As described above, the aerial vehicle 10A according to the second embodiment is configured such that the flight controller 34A controls the aerodynamic force generated by each of the active thrusters when it is determined that there is a malfunction in at least one of the thrusters 41 to 48. Specifically, the flight controller 34A deactivates the at least one malfunctioned thruster and the thruster, which is opposite and paired to the at least one malfunctioned thruster. This prevents aerodynamic force based on the thrusters 41 to 48 from being unbalanced due to deactivation of the at least one malfunctioned thruster, thus making the flight attitude of the aerial vehicle 10A stable.

Additionally, the flight controller 34A increases the output of each of the active thrusters (for example, thrusters 41, 43, 44, 45, 47, and 48 as illustrated in FIG. 8) to be higher than a corresponding present output level. Then, the flight controller 34A determines whether the flight altitude of the aerial vehicle 10A has increased since the increasing of the output of each of the active thrusters.

When it is determined that the flight altitude of the aerial vehicle 10A has increased since the increasing of the output of each of the active thrusters 41, 43, 44, 45, 47, and 48, the flight controller 34A performs the continuous flying task up to the predetermined safe place while maintaining the flight attitude of the aerial vehicle 10A stable.

Otherwise, when it is determined that the flight altitude of the aerial vehicle 10A has decreased since the increasing of the output of each of the active thrusters, the flight controller 34A performs the landing task while maintaining the stable flight attitude of the aerial vehicle 10A without flying of the aerial vehicle 10A to the predetermined safe place.

That is, the configuration of the aerial vehicle 10A according to the second embodiment enables the aerial vehicle 10A to continuously fly or land according to the remaining ability of the aerial vehicle 10A while ensuring the safety of the aerial vehicle 10A even if there is a malfunction in at least one of the thrusters 41 to 48.

In addition, after start of the continuously flying of the aerial vehicle 10A, the flight controller 34A according to the second embodiment is configured to continuously fly the aerial vehicle 10A as long as at least one pair of thrusters are activated and the at least one active thrusters has enough remaining ability to continuously fly the aerial vehicle 10A. This configuration further improves the safety of the aerial vehicle 10A.

Third Embodiment

Next, the following describes an aerial vehicle 10B according to the second embodiment.

The structures and/or functions of the aerial vehicle 10B according to the third embodiment are different from those of the aerial vehicle 10 according to the first embodiment by the following points. So, the following mainly describes the different points, and omits or simplifies descriptions of like parts between the first and third embodiments, to which identical or like reference characters are assigned, thus eliminating redundant descriptions.

Figure 12:
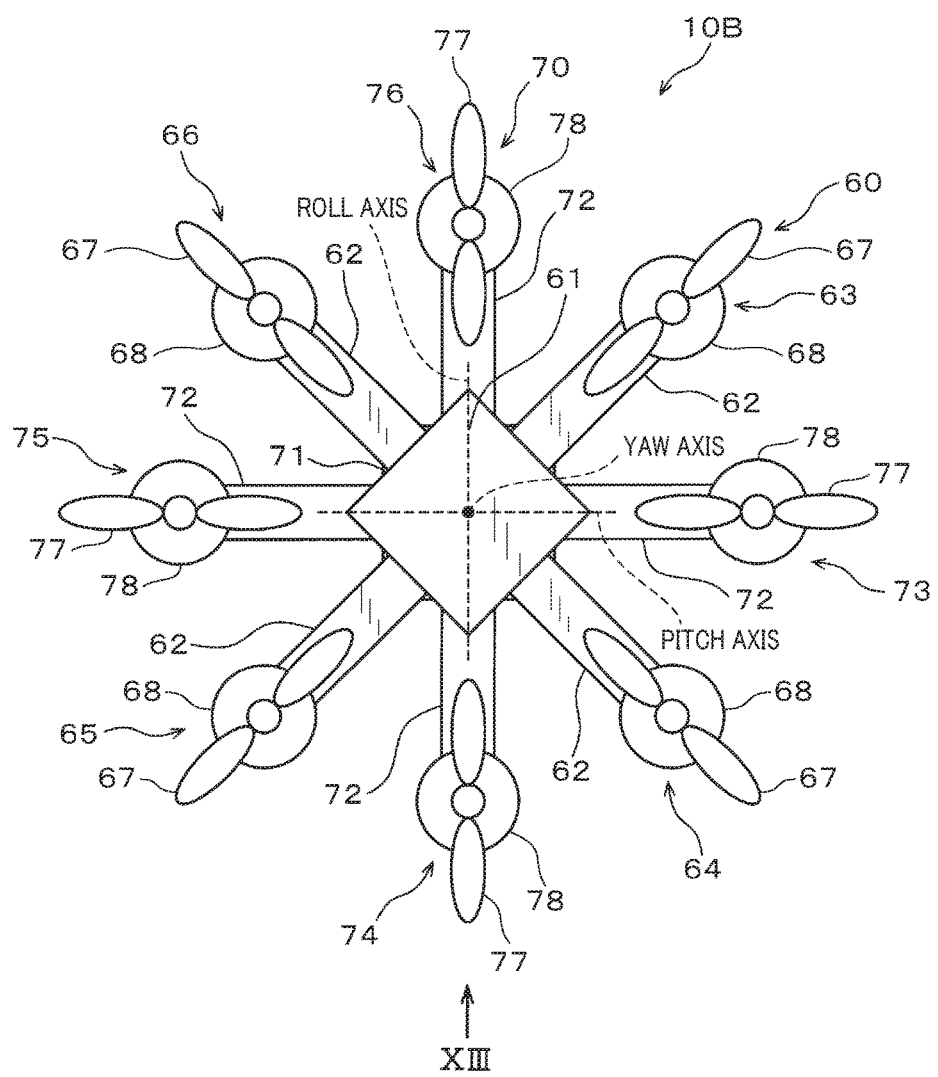
FIG. 12 is a structural view schematically illustrating the aerial vehicle according to the third embodiment of the present disclosure.
Figure 13:
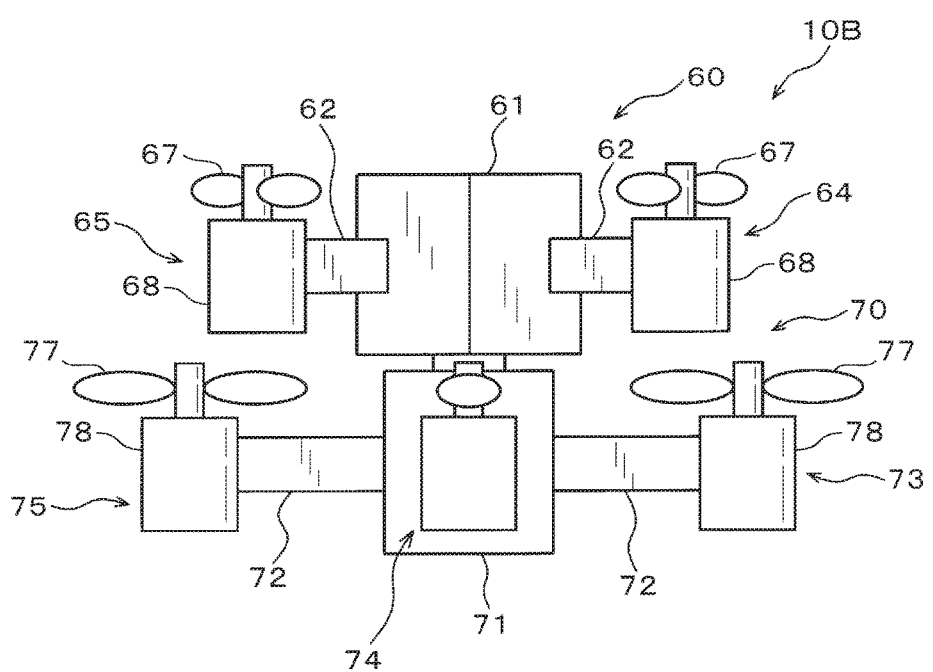
FIG. 13 is structural view of the aerial vehicle illustrated in FIG. 12 when the aerial vehicle is viewed from an arrow XIII of FIG. 12.

Referring to FIGS. 12 and 13, the aerial vehicle 10B includes a first flight unit 60 and a second flight unit 70, which have the same configurations between each other, aligned in the yaw axis of the aerial vehicle 10B. The aerial vehicle 10B is specially configured such that the first flight unit 60 and the second flight unit 70 are offset in the yaw axis of the aerial vehicle 10B.

The first flight unit 60 includes a vehicle body 61 serving as, for example, a first vehicle body element, and a plurality of, for example four, arms 62 having identical configurations. For example, the vehicle body 61 has a hollow rectangular-parallelepiped shape with top and bottom surfaces 61a and 61b and four side surfaces.

Each of the four arms 62 has first and second ends opposite to each other. The first end of each of the four arms 62 is joined to a corresponding one of the four side surfaces of the vehicle body 61 such that the arm 62 radially extends from the corresponding one of the four side surfaces of the vehicle body 61. In particular, the four arms 62 radially extend from the respective four side surfaces of the vehicle body 61 while having regular intervals therebetween. In other words, the four arms 62 radially extend from the respective four side surfaces of the vehicle body 61 to be symmetrical with each other with respect to the vehicle body 61. The four arms 62 include two pairs of arms 62. The arms 62 of each of the pairs extend from the vehicle body 61 in the respective opposite directions on the corresponding same radial line passing through the center of gravity of the vehicle body 61.

The first flight unit 60 also includes thrusters 63 to 66. Each of the thrusters 63 to 66 is mounted on the second end of the corresponding one of the arms 62. Each of the thrusters 63 to 66 includes a propeller 67 and a motor 68. The motor 68 of each thruster 63 to 66 is mounted on the second end of the corresponding arm 62. The propeller 67 of each thruster 63 to 66 is provided on the corresponding motor 68 to be rotatable about a rotational axis of the corresponding motor 68; the rotational axis is parallel to the center axis of the rectangular-parallelepiped vehicle body 61.

The second flight unit 70 includes a vehicle body 71 serving as, for example, a second vehicle body element, and a plurality of, for example four, arms 72 having identical configurations. For example, the vehicle body 71 has a hollow rectangular-parallelepiped shape with top and bottom surfaces 71a and 71b and four side surfaces.

Each of the four arms 72 has first and second ends opposite to each other. The first end of each of the four arms 72 is joined to a corresponding one of the four side surfaces of the vehicle body 71 such that the arm 72 radially extends from the corresponding one of the four side surfaces of the vehicle body 71. In particular, the four arms 72 radially extend from the respective four side surfaces of the vehicle body 71 while having regular intervals therebetween. In other words, the four arms 72 radially extend from the respective four side surfaces of the vehicle body 71 to be symmetrical with each other with respect to the vehicle body 61. The four arms 72 include two pairs of arms 72. The arms 72 of each of the pairs extend from the vehicle body 71 in the respective opposite directions on the corresponding same radial line passing through the center of gravity of the vehicle body 71.

In particular, the vehicle body 61 is disposed over the vehicle body 71 in the yaw axis of the aerial vehicle 10B such that the radially extending arms 62 are non-interference with the radially extending arms 72. For example, an angle formed between a pair of adjacent arms 62 and 72 of the aerial vehicle 10B when viewed from above of the aerial vehicle 10B is substantially set to 45 degrees.

The second flight unit 70 also includes thrusters 73 to 76. Each of the thrusters 73 to 76 is mounted on the second end of the corresponding one of the arms 72. Each of the thrusters 73 to 76 includes a propeller 77 and a motor 78. The motor 78 of each thruster 73 to 76 is mounted on the second end of the corresponding arm 72. The propeller 77 of each thruster 73 to 76 is provided on the corresponding motor 78 to be rotatable about a rotational axis of the corresponding motor 78; the rotational axis is parallel to the center axis of the rectangular-parallelepiped vehicle body 71.

In other words, the first group of three pairs of arms 62 are joined to the vehicle body 61, and the second group of three pairs of arms 72 are joined to the vehicle body 71. The arms 62 of the three pairs of the first group and the arms 72 of the pairs of the second group are configured to radially extend while being non-interference with each other.

That is, the aerial vehicle 10B, which has the eight arms 62 and 72, according to the third embodiment operates equivalently to the eight-arm aerial vehicle 10B according to the second embodiment.

The aerial vehicle 10B includes at least one control unit 30 installed in the vehicle body 61 or vehicle body 71 for controlling the overall operations of the aerial vehicle 10B.

For example, first and second control units 30 can be installed in the respective vehicle bodies 61 and 71. One of the two control units 30 for example includes the malfunction determiner 32, the attitude detector 33, and the flight controller 34, and the other thereof for example includes the flight controller 34. In this modification, the flight controller 34, which is referred to as a first flight controller 34, installed in the vehicle body 61 and the flight controller 34, which is referred to as a second flight controller 34, installed in the vehicle body 71 communicate with each other. The first flight controller 34, which individually controls the rotational speed of each of the motors 68, and the second flight controller 34, which individually controls the rotational speed of each of the motors 78, control how the aerial vehicle 10B operates, i.e. flies, in cooperation with each other.

As another example, a single control unit 30 can be installed in one of the vehicle bodies 61 and 71. The flight control unit 34 of the single control unit 30 individually controls the rotational speed of each of the motors 68 and 78, thus controlling how the aerial vehicle 10B operates, i.e. flies.

The at least one flight controller 34 according to the third embodiment is configured to perform a safety routine, which is substantially identical to the safety routine illustrated in FIG. 9 or FIG. 10 if there is a malfunction in at least one of the thrusters 63 to 66 and 73 to 76.

That is, the configuration of the aerial vehicle 10B according to the third embodiment enables the aerial vehicle 10B to continuously fly or land according to the remaining ability of the aerial vehicle 10B while ensuring the safety of the aerial vehicle 10A even if there is a malfunction in at least one of the thrusters 63 to 66 and 73 to 76.

The aerial vehicle 10B can include three or more flight units, which have the same configurations between each other, aligned in the yaw axis of the aerial vehicle 10B.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An aerial vehicle comprising:
    a vehicle body;
    plural pairs of arms each having opposing first and second ends, the first end of each arm being joined to the vehicle body, the arms of each pair radially extending from the vehicle body to be symmetrical with one another with respect to the vehicle body;
    thrusters mounted on the second ends of the respective arms, the thruster in one of the arms in each pair being paired to the thruster of the other of the arms in the pair, each of the thrusters being configured to generate aerodynamic force as an output thereof;
    a flight attitude detector configured to detect a flight attitude of the aerial vehicle;
    a flight altitude detector configured to detect a flight altitude of the aerial vehicle;
    a flight position detector configured to detect a flight position of the aerial vehicle;
    a malfunction determiner configured to determine whether there is a malfunction in one of the thrusters; and
    a flight controller configured to:
        activate the thrusters;
        control the output of each of the thrusters;
        deactivate, when it is determined that there is a malfunction in one of the thrusters as a malfunctioned thruster, the malfunctioned thruster;
        deactivate a selected thruster in the thrusters; the selected thruster being paired to the malfunctioned thruster;
        control the active thrusters except for the deactivated thrusters in all the thrusters to make the flight attitude of the aerial vehicle stable;
        increase the output of each of the active thrusters after deactivation of the pair of the malfunctioned thruster and the selected thruster;
        determine whether the flight altitude of the aerial vehicle detected by the flight altitude detector at least has been maintained since the increasing of the output of each of the active thrusters to thereby determine whether the aerial vehicle has enough remaining ability to continuously fly by the active thrusters after deactivation of the pair of the malfunctioned thruster and the selected thruster;
        perform a continuous flying task that individually controls the output of each of the active thrusters to continuously fly the aerial vehicle to a predetermined place while maintaining the flight attitude of the aerial vehicle stable when it is determined that the flight altitude of the aerial vehicle detected by the flight altitude detector at least has been maintained since the increasing of the output of each of the active thrusters so that it is determined that the aerial vehicle has the enough remaining ability to continuously fly by the active thrusters after deactivation of the pair of the malfunctioned thruster and the selected thruster; and
        individually control, based on the flight position of the aerial vehicle detected by the flight position detector, the output of each of the active thrusters so that the aerial vehicle lands independently of the flight altitude of the aerial vehicle while maintaining the flight attitude of the aerial vehicle stable when it is determined that the flight altitude of the aerial vehicle detected by the flight altitude detector has decreased since the increasing of the output of each of the active thrusters so that it is determined that the aerial vehicle does not have the enough remaining ability to continuously fly by the active thrusters after deactivation of the pair of the malfunctioned thruster and the selected thruster.

2. The aerial vehicle according to claim 1, wherein:
    the vehicle body has a yaw axis around which the aerial vehicle is rotatable, and includes a first vehicle body element and a second vehicle body element aligned in the yaw axis; and
    the plural pairs of arms include:
        a first group of pairs of arms being joined to the first vehicle body element; and
        a second group of pairs of arms being joined to the second vehicle body element,
    the arms of the pairs of the first group and the arms of the pairs of the second group are configured to radially extend while being non-interference with each other.

3. The aerial vehicle according to claim 1, wherein the flight controller is configured to:
   determine whether the flight altitude of the aerial vehicle detected by the flight altitude detector has increased since the increasing of the output of each of the active thrusters; and
   perform the continuous flying task that individually controls the output of each of the active thrusters to continuously fly the aerial vehicle up to the predetermined place while maintaining the flight attitude of the aerial vehicle stable when it is determined that the flight altitude of the aerial vehicle detected by the flight altitude detector has increased since the increasing of the output of each of the active thrusters.

4. The aerial vehicle according to claim 3, wherein the flight controller is configured to:
   determine whether the aerodynamic lift generated by all the active thrusters is greater than a payload of the aerial vehicle; and
   continuously perform the continuous flying task as long as the thrusters of at least one pair of the arms are activated and it is determined that the aerodynamic lift generated by all the active thrusters is greater than the payload of the aerial vehicle.

\* \* \* \* \*